United States Patent [19]

Young et al.

[11] Patent Number: 5,255,150

[45] Date of Patent: Oct. 19, 1993

[54] GROUNDING DEVICE FOR POWER LINES

[76] Inventors: J. Ronald Young; Dorothy J. Young, both of 9900 LaView Cir., Roswell, Ga. 30075

[21] Appl. No.: 816,293

[22] Filed: Dec. 11, 1991

[51] Int. Cl.[5] .............................................. H02G 7/18
[52] U.S. Cl. .................................. 361/107; 174/40 R; 361/56
[58] Field of Search ............................ 361/107, 54, 56; 174/40 R, 5 R, 43, 556

[56] References Cited

U.S. PATENT DOCUMENTS

| 304,087 | 8/1884 | Edison | 361/107 |
|---|---|---|---|
| 556,823 | 3/1896 | Jewett | 361/107 |
| 928,431 | 7/1909 | Elliot | 361/107 |
| 4,616,287 | 10/1986 | Reedy | 361/107 |

Primary Examiner—Marc S. Hoff
Assistant Examiner—S. Jackson
Attorney, Agent, or Firm—James B. Middleton

[57] ABSTRACT

A grounding device is automatically operable to create a short circuit in the event of a mechanical fault on a pole line. The grounding device is placed below, and close to, each phase line on a pole line. When the phase line moves down, because of a broken wire or the like, the wire engages a sensing member which moves down and causes projection of a grounding tongue. The sensing member has surfaces that direct the wire to a contact area; and, the wire moves the sensing member down, causing projection of a grounding tongue, which will contact the phase line. Before actuation, the tongue, and all portions at ground potential, are enclosed within an insulating housing. A transmitter may also be actuated to broadcast the location of the grounding device.

6 Claims, 1 Drawing Sheet

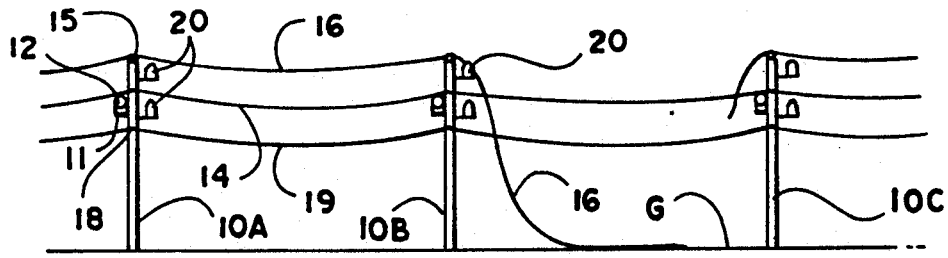
_Fig_1.
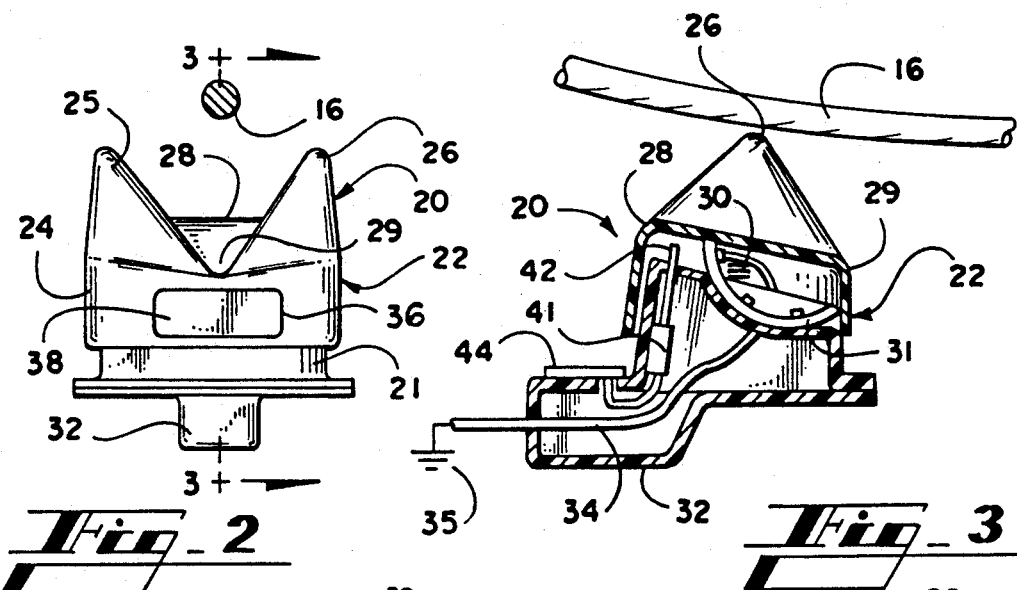
_Fig_2.   _Fig_3.
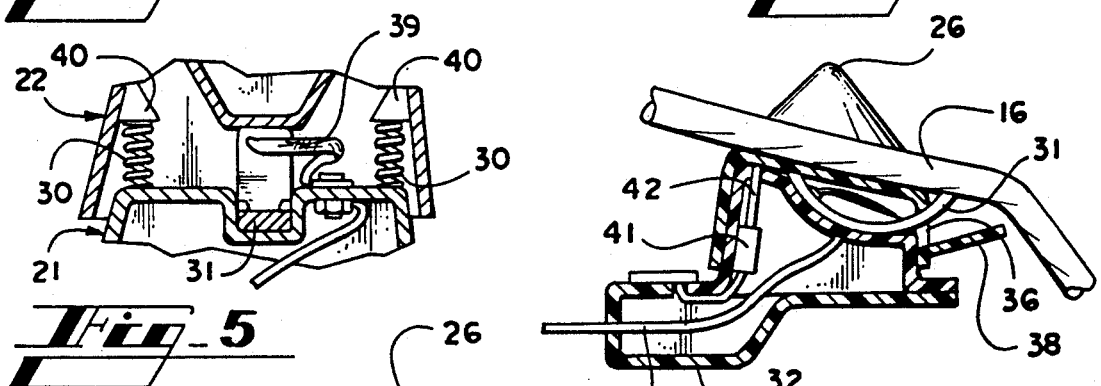
_Fig_5.   _Fig_4.
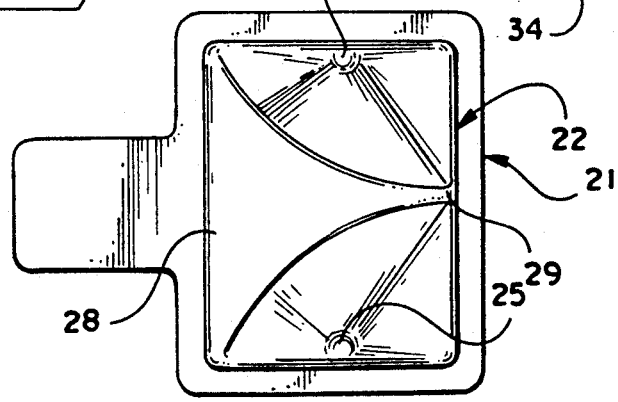
_Fig_6.

GROUNDING DEVICE FOR POWER LINES

BACKGROUND OF THE INVENTION

Much of the electrical power distribution system is mounted on poles above the ground, and virtually all of the electrical transmission lines are mounted on poles or towers above the ground. Both distribution and transmission systems always include some form of automatically operable switch means for deenergizing the line in the event of an electrical fault. Such switch means are primarily for the purpose of protecting the electrical equipment in the event of a short circuit or an overload. Nevertheless, the automatic switch means will sometimes deenergize a power line because of a broken wire, damaged pole or tower structure or the like. The difficulty arises in the event wherein an electrical wire has broken and is lying close to the ground, or simply sagging due to lack of support or the like, and being disposed relatively close to the ground. In many situations, these events occur without sufficient contact between two or more wires to cause the automatic switch means to deenergize the power line. For example, if a tree limb falls and breaks a single wire on a pole, the wire may fall to the ground, but not engage the ground firmly enough to cause the flow of sufficient current to operate the automatic switch means. The result is that a live electrical power line is in a position to be engaged by people, which can be very hazardous. Also, a pole might be broken, and the entire top of the pole may stay intact so that a portion of the pole, along with the crossarms, will be supported from the wires, carried by the two adjacent poles. In such a situation, the wires may be close enough to the ground to be engaged by pedestrians or vehicles, but it is very likely that the electrical conductors will not touch one another firmly enough to operate the automatic switch means.

There has been some effort in the past to resolve these problems. U.S. Pat. No. 4,616,287 to Reedy discloses a transverse rod fixed to the neutral conductor on the pole line. The idea is that if a phase line breaks, the phase line will engage the transverse rod and cause a direct short circuit to the ground line, which will operate the automatic switch means. It will be obvious that such a system will not be effective in the event a pole is broken off as is discussed above.

Another prior art effort at solving the above mentioned problems is shown in U.S. Pat. No. 556,823 issued to Jewett. The Jewett device senses the position of a wire, and creates a short circuit in the event the wire is either missing or is extremely low. However, the Jewett device is open so that it would be hazardous to service people working on the lines, and is so constructed that a less-than-serious fault on the lines might cause a short circuit, to interrupt the electric power.

Thus, the prior art does not provide an adequate solution for the above stated problems.

SUMMARY OF THE INVENTION

This invention relates generally to electric power transmission and distribution, and is more particularly concerned with means for grounding a conductor in the event of a mechanical fault in the lines.

The present invention provides means for determining when an electrical conductor is lower than it is intended to be, and means for directly grounding a conductor determined to be too low. The grounding means of the present invention is disposed below a conductor and adjacent thereto, and includes guiding means for guiding a conductor to a grounding location, and a grounding tongue extendible on engagement of the grounding device by a conductor.

Before activation, the grounding device of the present invention is completely enclosed within insulating means so that it does not constitute an electrical hazard to a person working nearby; and, the device can be preset to require any desired operating force. As a result, the device of the present invention can be used on small distribution lines where the wire size may be in the vicinity of #2 AWG, and may also be used on high power lines wherein the wire size may be in the vicinity of several hundred thousand circular mils.

The present invention may also include a transmitter unit activated when the grounding device is actuated, the transmitter indicating the geographic location of the fault.

BRIEF DESCRIPTION OF THE DRAWINGS

These and other features and advantages of the present invention will become apparent from consideration of the following specification when taken in conjunction with the accompanying drawings in which:

FIG. 1 is a side elevational view showing a pole line having grounding made in accordance with the present invention mounted thereon, and showing one broken wire;

FIG. 2 is an enlarged, front elevational view of one of the grounding devices shown in FIG. 1, and showing an electrical conductor in its normal position in relation thereto;

FIG. 3 is a cross-sectional view taken substantially along the line 3—3 in FIG. 2;

FIG. 4 is a view similar to FIG. 3, but showing a conductor in place after the device has been actuated;

FIG. 5 is a fragmentary cross-sectional view showing the constructional details of the device shown in FIGS. 2-4; and, FIG. 6 is a top plan view of the device shown in FIG. 2.

DETAILED DESCRIPTION OF THE EMBODIMENT

Referring now more particularly to the drawings, and to that embodiment of the invention here presented by way of illustration, FIG. 1 shows a plurality of utility poles designated at 10A, 10B and 10C. As is conventional, there are crossarms 11 carrying insulators 12, the insulators 12 having a wire 14 fixed thereto. The wire 14, then, extends between the various poles 10. Those skilled in the art will understand that the wire 14 typically has a certain sag, following the shape of a catenary.

One very common form of construction for electrical distribution systems is to utilize the crossarm 11, and to place two phase wires on the crossarm, one at each end thereof. The upper end of the pole then carries an insulator 15 which carries another phase wire 16. Below the crossarm 11, and mounted on a series of insulators 18 there is the neutral, or ground, wire 19. Again, those skilled in the art will understand that this is one very common type of construction, but the present invention is usable with virtually any form of construction so long as there is a span of wire supported between two poles, towers or the like.

The expression "phase wire" is intended to indicate a wire having a given electrical potential above ground, so there will be a voltage between one phase wire and the neutral, or ground, and there will be a higher voltage between two different phase wires. Thus, a distribution line may include only one phase wire and one ground wire. Any combination is anticipated by the present invention, and the numerous constructions will be well understood by those skilled in the art.

On each of the poles 10, and adjacent to each of the phase wires 14 and 16, there is a grounding device generally indicated at 20. It will be understood that there will be one of the grounding devices 20 adjacent to each phase wire in each span in the pole line. With such an arrangement, virtually any problem with the wires and the pole line will cause sufficient sagging of at least one conductor to actuate the grounding device 20. For example, the wire 16 is shown as broken between the poles 10B and 10C, so a length of the wire 16 is lying on the ground. Since there is a grounding device 20 within that same span for that wire, the grounding device 20 will be actuated to cause a direct short circuit and operate the cutout or other fusing device to deenergize the line 16.

Attention is next directed to FIGS. 2 and 3 of the drawings for an understanding of the construction of the grounding device of the present invention. The grounding device 20 includes a base member 21 and an upper, sensing member 22. The base member 21 will be mounted stationarily with respect to the pole or tower, and the sensing member 22 is movable vertically with respect to the base member 21 to respond to excess weight.

The upper, sensing member 22 has a body portion 24 that telescopes over the base member 21, and includes a pair of guides 25 and 26. The guides 25 and 26 are upstanding members, shaped somewhat like half of a cone. This construction will be better understood with reference to FIG. 6 of the drawings in conjunction with FIG. 2. It can be seen that the upstanding members have their apexes at the outer edges of the body 24, and the sloped surfaces of the cones are directed inwardly of the device.

While the guide members 25 and 26 are somewhat conical in shape, the body 24 is higher at the rear edge 28 than at the front edge 29. With these two shapes intersecting, it will be noticed that the rear of the device has a wide space between the guide members 25 and 26. As the surface slopes down, the conical guide members increase in radius, so the front of the device defines a relatively narrow area at the front edge 29.

As a result of the shape of the sensing member, it will be understood that a wire that falls generally onto the grounding device of the present invention will be directed to a narrowly defined front edge 29, the steeply inclined walls on both sides assuring that the conductor remains confined.

Attention is directed to FIGS. 3 and 5 of the drawings for an understanding of the internal operation of the grounding device. In FIG. 3 it can be seen that the body 24 of the sensing device 22 is telescoped over the base member 21, and there is a yieldable means to hold the sensing member 22 up until actuation is desired. In FIG. 3, the yieldable means takes the form of a spring 30 which supports the sensing member 22 from the base member 21.

The base member 21 supports a grounding tongue 31; and, in FIG. 2 the grounding tongue 31 is entirely enclosed within the confines of the sensing member 22, so there is no danger of a worker's contacting both the phase line 16 and the ground. Furthermore, the ground line 34 for attachment to the tongue 31 is enclosed within the rearward extension 32 of the base member 21, so there is no part of the device of the present invention that will present an electrical hazard to a worker in the vicinity of the device. The line 34 will of course be grounded, or connected to the neutral line 19, as indicated at 35.

The tongue 31 is in the form of a circular arc as shown in FIG. 3, and the tongue 31 is received within a circular indentation in the base member 21. In the position shown in FIG. 3, the rear, or upper, end of the tongue 31 is adjacent to the surface of the sensing member 22, while the forward end of the tongue is adjacent to the front wall of the sensing member 22. The front wall of the sensing member 22 defines a port 36 covered by a door 38.

When excess weight is placed on the sensing member 22, it will be understood that the weight will overcome the tension of the spring 30, and the sensing member 22 will move down. In doing so, the rear end of the tongue 31 will be urged down, so the tongue 31 will move arcuately in its recess, causing the forward end to be projected. When the tongue 31 is projected, it will open the door 38 so the tongue 31 will extend through the port 36. It must also be recognized that the tongue 31 is aligned with the narrow front edge 29 of the sensing member 22. Thus, as is shown in FIG. 4, when a wire engages the sensing member 22 and causes actuation of the device, the wire will be held, narrowly confined, at the edge 29. In this position, the tongue 31 will solidly engage the wire 16. Since the wire 16 is a phase wire, and the tongue 31 is connected to ground, a direct short circuit will be provided, yielding sufficient current flow to actuate the automatic switch, whether pole-type cutouts, or circuit breakers in a substation or the like.

Looking briefly at FIG. 5 of the drawings, the connection between the tongue 31 and the wire 34 is shown. There is a flexible connector, such as a braided member 39, fixed to the tongue 31 and to the wire 34. The braided member 39 is sufficiently flexible to allow the desired motion of the tongue 31.

FIG. 5 also shows one form of yieldable means for the sensing member 22. Spring abutments 40 are provided within the sensing means 22, and springs 30 extend between these abutments 40 and the surface of the base 21. The springs can be attached by fasteners or the like, or may be snapped over bosses formed on the abutments and on the base member. By fixing the springs 30 at each end, the sensing member 22 will be held to the base member 21.

It will thus be understood that the present invention provides a grounding device that can be used on poles in an electrical distribution system, or on towers of a high voltage transmission system. All electrically conducting portions of the device are completely enclosed within an insulating housing until the device is actuated, so the device is safe for workers in the vicinity.

The precise nature of the housing of the device will of course vary somewhat depending on the location, and the voltage of the lines. It is contemplated that a plastic will be used. If great strength is required, a glass reinforced epoxy may be used, or a polyolefin or polyester may be molded of an appropriate thickness for the required dielectric strength. Other materials and techniques will suggest themselves to those skilled in the art.

One of the major difficulties with the maintenance of pole lines is in knowing where the fault is; and, though the device of the present invention may interrupt the power to render the line safe, customers will now be without electric power. Someone therefore needs to be notified of the problem, and means for such notification is shown in FIGS. 3 and 4.

In FIG. 3, there is a transmitting device 41 mounted within the base member 21. An actuating plunger 42 extends from the device 41 to a position to be engaged by the sensing member 22. Photovoltaic cells 44 may be provided to be sure the batteries for the transmitter remain charged.

It is contemplated that the transmitter 41 will be designed to transmit a unique signal, for example including a pole number or other data to identify the geographic location of the transmitter. Thus, when there is a fault that causes operation of the grounding device 20, the transmitting device 41 will begin to broadcast the location. Either fixed receiving stations or cruising vehicles can receive the signal and determine the location of the damage.

It should therefore be understood that the particular embodiment of the invention here shown is by way of illustration only, and is meant to be in no way restrictive; therefore, numerous changes and modifications may be made, and the full use of equivalents resorted to, without departing from the spirit or scope of the invention as outlined in the appended claims.

We claim:

1. A grounding device for an electric power line, said power line being mounted on a plurality of poles constituting a pole line and including at least one phase line having an electric potential above ground potential, said grounding device being supported from one pole of said plurality of poles and including a base member formed of electrical insulating material fixed with respect to said one pole, a sensing member formed of electrical insulating material and yieldably carried by said base member for selective movement towards said base member, said sensing member being located beneath and adjacent to said at least one phase line and including directing means, and a contact area, the arrangement being such that in the event said phase line moves down towards said grounding device, said line will be directed to said contact area, an electrically conducting grounding tongue carried by said base member, said tongue being normally confined within said grounding device to be electrically insulated from said phase line, and projectable beyond said grounding device when said sensing member moves towards said base member, said grounding tongue being connected to ground potential.

2. A grounding device as claimed in claim 1, said sensing member including a body telescoping over said base member, and at least one spring means for yieldably supporting said sensing member from said base member.

3. A grounding device as claimed in claim 1, said base member defining a generally arcuate indentation, said tongue being arcuate and received in said arcuate indentation, said tongue normally having its rearward end above said base member for engagement by said sensing member, the arrangement being such that the forward end of said tongue will move forward on downward movement of said sensing member.

4. A grounding device as claimed in claim 3, said sensing member including a front wall adjacent to said forward end of said tongue, a port defined in said front wall, and a door selectively closing said port.

5. A grounding device as claimed in claim 4, said pole line including a plurality of phase lines, and including a grounding device adjacent to each phase line of said plurality of phase lines on each pole of said plurality of poles.

6. A grounding device as claimed in claim 1, and further including transmitting means for transmitting data indicating the location of said grounding device, said transmitting means being received within said base member and including actuating means selectively engageable by said sensing means.

* * * * *